United States Patent [19]

Kadoya

[11] Patent Number: 4,976,858
[45] Date of Patent: Dec. 11, 1990

[54] MULTI-LAYER FILTER MEDIUM

[75] Inventor: Teruichi Kadoya, Shizuoka, Japan

[73] Assignee: Toyo Roki Seizo Kabushiki Kaisha, Shizuoka, Japan

[21] Appl. No.: 473,144

[22] Filed: Feb. 1, 1990

Related U.S. Application Data

[63] Continuation of Ser. No. 230,555, Aug. 10, 1988, abandoned.

[30] Foreign Application Priority Data

Aug. 12, 1987 [JP] Japan ................... 62-199918
Aug. 12, 1987 [JP] Japan ................... 62-199919

[51] Int. Cl.$^5$ ............................................. B01D 39/14
[52] U.S. Cl. ................................... 210/496; 210/505; 210/508; 55/486; 55/487
[58] Field of Search .................... 210/505, 508, 493.1, 210/651, 493.2, 493.5, 496, 488; 55/486, 485, 487

[56] References Cited

U.S. PATENT DOCUMENTS

| | | | |
|---|---|---|---|
| 3,003,643 | 10/1961 | Thomas | 210/505 |
| 3,452,877 | 7/1969 | Mesek et al. | 210/505 |
| 3,591,010 | 7/1971 | Pall et al. | 210/493 |
| 3,690,852 | 9/1972 | Smith et al. | 55/485 |
| 3,815,341 | 6/1974 | Hamano | 55/486 |
| 4,073,732 | 2/1978 | Lauer et al. | 55/487 |
| 4,093,437 | 6/1978 | Ichihara et al. | 55/487 |
| 4,111,815 | 9/1979 | Walker et al. | 55/486 |
| 4,257,791 | 3/1981 | Wald | 55/487 |
| 4,522,876 | 6/1985 | Hiers | 55/486 |
| 4,528,008 | 7/1985 | Tagaki et al. | 55/485 |
| 4,564,376 | 1/1986 | Billiet | 55/486 |
| 4,619,674 | 10/1986 | Erdmanasdörfer | 55/486 |
| 4,668,393 | 5/1987 | Stone | 210/493.2 |
| 4,687,697 | 8/1987 | Cambo et al. | 210/505 |
| 4,707,269 | 11/1987 | Ohue et al. | 210/651 |
| 4,759,782 | 7/1988 | Miller et al. | 210/505 |
| 4,793,923 | 12/1988 | Kadoya et al. | 210/505 |
| 4,925,560 | 5/1990 | Sorrick | 210/505 |

Primary Examiner—Richard V. Fisher
Assistant Examiner—Cynthia L. Nessler
Attorney, Agent, or Firm—Sughrue, Mion, Zinn, Macpeak & Seas

[57] ABSTRACT

A filter medium comprises nonwoven fabric of a lower fiber density and filter paper of a higher fiber density, the nonwoven fabric and the filter paper being superposed in a laminated structure. The nonwoven fabric and the filter paper are disposed upstream and downstream, respectively, in a direction in which a fluid to be filtered flows. Since the nonwoven fabric of a lower density is disposed upstream and the filter paper of a higher density is disposed downstream, relatively large particles are trapped by the upstream nonwoven fabric to promote the formation of a dust cake layer on the surface of the filter paper. Such surface trapping may prevent the particles from being embedded within the filter medium, thus preventing the filter medium from being clogged therein.

4 Claims, 3 Drawing Sheets

MULTI-LAYER FILTER MEDIUM

This is a continuation of application No. 07/230,555 filed Aug. 10, 1988, now abandoned.

BACKGROUND OF THE INVENTION

The present invention relates to a filter medium, and more particularly to a filter medium for use in an oil filter or an air filter for an internal combustion engine.

Filter mediums for use in oil and air filters for internal combustion engines for automobiles or the like are required to have such filtration efficiency as to effectively remove minute particles such as dust particles from a fluid being filtered and also to keep good filtering performance for a long period of time.

Various filter mediums have heretofore been proposed to meet the above requirements. However, the conventional filter mediums have proven unsatisfactory in achieving both increased filtration efficiency and longer service life.

There is known a filter medium formed of filter paper only, which filter paper comprises pulp, rayon and linter. In use, the filter medium composed of filter paper only forms on its surface a dust cake layer which has a filtering function (i.e., primal filtration function) for increased filtration efficiency.

The filter medium formed of the filter paper of this type is normally impregnated with oil in order to promote the formation of a dust cake layer on the surface thereof.

The oil impregnated in the filter medium, however, serves as a carrier for carrying the dust through the filter paper, with the result that the dust tends to be mixed with the fluid being filtered, thus lowering the filtering efficiency of the filter medium. Even if the dust does not pass through the filter paper, it is trapped by a deep layer in the filter paper (so-called "depth-type filtration"), causing the filter paper to be plugged or clogged, and consequently the pressure loss across the filter medium is increased.

During use of the filter medium over many years, the amounts of impregnated oil is reduced due to evaporation, and no sufficient formation of a dust cake layer is accomplished. Therefore, the primal filtering function is no longer performed by the dust cake layer, and the desired long service life cannot be achieved.

Another problem is that the oil impregnated in the filter paper is liable to be scattered around to clog a carburetor in the case where the filter medium is used in an air filter.

SUMMARY OF THE INVENTION

It is, therefore, an object of the present invention to overcome the above-described drawbacks and disadvantages and to provide a filter medium which has both an increased filtration efficiency and a long service life According to one aspect of the present invention, the above object can be achieved by a filter medium comprising nonwoven fabric of a lower fiber density and filter paper of a higher fiber density, the nonwoven fabric and the filter paper being superposed in a laminated structure, the nonwoven fabric and the filter paper being disposed upstream and downstream, respectively, in a direction in which a fluid to be filtered flows.

According to another aspect of the present invention, there is provided a filter medium comprising nonwoven fabric of a lower fiber density which comprises at least two layers, and filter paper of a higher fiber density. The nonwoven fabric and the filter paper being superposed in a laminated structure, one of the layers of the nonwoven fabric which is closer to the filter paper being thermally fusible, the nonwoven fabric and the filter paper being joined together through the thermally fusible layer of the nonwoven fabric, the nonwoven fabric and the filter paper being disposed upstream and downstream, respectively, in a direction in which a fluid to be filtered flows.

With the above arrangement, the nonwoven fabric of a lower density is disposed upstream and the filter paper of a higher density is disposed downstream. The later of the nonwoven fabric which is held in intimate contact with the filter paper is thermally fusible, and the nonwoven fabric and the filter paper are joined together by the thermally fusible layer. Relatively large particles are &rapped by the upstream nonwoven fabric to promote the formation of a dust cake layer on the surface of the filter paper. Such surface trapping may prevent the particles from being embedded within the filter medium, thus preventing the filter medium from being clogged therein.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
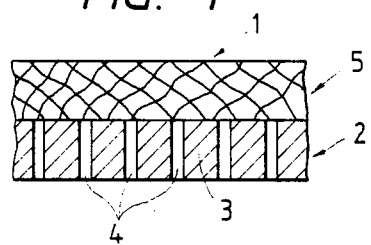
FIG. 1 is fragmentary cross-sectional view of a filter medium according to a first embodiment of the present invention.
Figure 2:
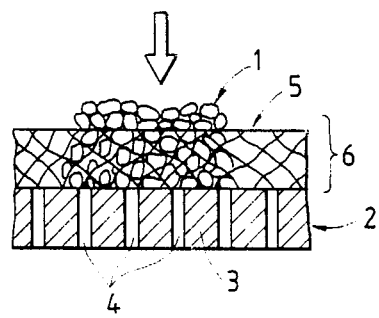
FIG. 2 is a fragmentary cross-sectional view showing the manner in which the filter medium of FIG. 1 operates.

FIGS. 1 and 2 illustrate a filter medium according to a first embodiment of the present invention.

A filter medium 1 comprises a layer of filter paper 2 and a layer of nonwoven fabric 5 which are placed in superposed relation in a laminated structure.

The filter paper 2 is made of 42.5by weight of linter, 42.5 wt% of pulp, and 15 wt% of rayon and has a thickness of 0.8 mm. The nonwoven fabric 5 is made of 80 % by weight of rayon and 20 wt% of polyester and has a thickness of 1.2 mm. The filter paper 2 and the nonwoven fabric 5 are placed as a layer on one the other, and thermally fused together, to thus provide the filter medium 1.

The filter paper 2 comprises a substrate 3 having a plurality of pores 4 defined therethrough and has a relatively high fiber density in the range of from 0.2 to 0.3 g/cm$^3$. The nonwoven fabric has a relatively low fiber density in the range of from 0.15 to 0.25 g/cm$^3$ and is of a net-like cross-sectional structure. In use, the filter medium 1 is placed in position with the nonwoven fabric 5 positioned upstream in the direction in which a fluid to be filtered flows and the filter paper 2 downstream.

Operation of the filter medium thus constructed will be described below with reference to FIG. 2.

With the nonwoven fabric 5 positioned upstream (facing upWardly as shown), a fluid to be filtered which flows in the direction Of the arrow is filtered by the low-density nonwoven fabric 5 (primary filtration), and then filtered by the high-density filter paper 2 (secondary filtration). Dust particles which are relatively large in diameter are trapped by the net like structure of the nonwoven fabric 5, forming a progressively growing dust cake layer 6 in and on the nonwoven fabric 5. The dust cake layer 6 performs a primal filtration function. Dust particles of relatively small diameter are partly trapped by the dust cake layer 6, and those dust particles which have passed through the dust cake layer 6 are trapped by the filter paper 2.

Therefore, relatively large dust particles such as dust and sand particles produced on general unpaved roads, and relatively small dust particles such as particulates contained in exhaust gases emitted from automobiles and particles such as carbon dust produced by abrasive wear of automobile tires can simultaneously be filtered by the filter medium.

A filter medium according to a second embodiment of the present invention will be described with reference to FIGS. 3 and 4.

A filter medium 1 comprises a layer of filter paper 2 and two layers of nonwoven fabric 5 which are placed in superposed relation in a laminated structure.

The filter paper 2 is made of 42.6% by weight of linter, 42.5 wt% of pulp, and 15 wt% of rayon and has a thickness of 0.8 mm. The nonwoven fabric 8 is made of 80% by weight of rayon and 20 wt% of polyester and has a thickness of 1.2 mm.

The filter paper 2 comprises a substrate 3 having a plurality of pores 4 defined therethrough and has a relatively high fiber density in the range of from 0.2 to 0.3 g/cm$^3$. The nonwoven fabric 5 has a relatively low fiber density and is of a net-like cross-sectional structure. The nonwoven fabric 5 is of two layers 5a, 5b.

The upper layer 5a is of a lower fiber density than the fiber density of the lower layer 5b. That is, the fiber density of the upper layer 5a is in the range of from 0.1 to 0.2 g/cm$^3$ and the fiber density of the lower layer 5b is in the range of from 0.15 to 0.25 g/cm$^3$. The lower layer 5b is thermally fusible. The filter paper 2 and the upper layer 6a are joined together by a heating roller (not shown) through the thermally fusible lower layer 5b.

In use, the filter medium 1 is placed in position with the nonwoven fabric positioned upstream in the direction in which a fluid to be filtered flows and the filter paper 2 downstream.

Operation of the filter medIum I thus constructed will be described below with reference to FIG.4.

With the nonwoven fabric positioned upstream (facing upwardly as shown), a fluid to be filtered which flows in the direction of the arrow is filtered by the low-density nonwoven fabric 5 (primary filtration), and then filtered by the high-density filter paper 2 (secondary filtration). Dust particles which are relatively large in diameter are trapped by the net-like structure of the nonwoven fabric 5, forming a progressively growing dust cake layer 6 in and on the nonwoven fabric 5. The dust cake layer 6 performs a primal filtration function. Dust particles of relatively small diameter are partly trapped by the dust cake layer 6, and those dust particles which have passed through the dust cake layer 6 are trapped by the filter paper 2.

The nonwoven fabric 5 which is composed of two layers 5a, 5b of different densities thus provides a density gradient which is higher downstream in the direction in which the fluid to be filtered flows. The lower density nonwoven fabric layer 5a is effective in trapping dust particles of greater diameter, whereas the higher-density nonwoven fabric layer 5b is effective in trapping dust particles of smaller diameter. The nonwoven fabric 5 can thus well sort out dust particles according to their size and form a good dust cake layer.

Therefore, relatively large dust particles such as dust and sand particles produced on general unpaved roads, and relatively small dust particles such as particulates contained in exhaust gases emitted from automobiles and particles such as carbon dust produced by abrasive wear of automobile tires can simultaneously be filtered by the filter medium 1.

Figure 5:
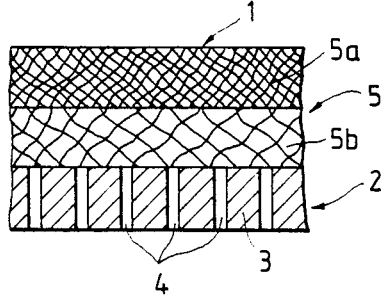
FIG. 5 is a fragmentary cross-sectional view of a filter medium according to a third embodiment of the present invention.

FIG. 5 shows a filter medium according to a third embodiment of the present invention.

The filter medium shown in FIG. 5 comprises a layer of filter paper 2 and two layers 5a, 5b of nonwoven fabric 5, the upper layer 5a being higher in fiber density than the lower layer 5b.

The upper nonwoven fabric layer 5a which is of a relatively coarse net-structure is positioned most upstream in the filter medium I in the direction in which a fluid to be filtered flows, and the lower nonwoven fabric layer 5b which is coarser than the upper layer 5a is positioned in an intermediate region of the filter medium 1. The fiber density of the upper layer 5a is in the range of from 0.15 to 0.25 g/cm$^3$ and the fiber density of the lower layer 5b is in the range of from 0.1 to 0.2 g/cm$^3$. The lower layer 5b serves as a dust collector chamber for &rapping and collecting many dust particles as a dust cake layer.

Figure 6:
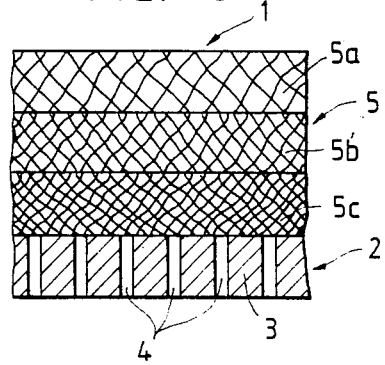
FIG. 6 is a fragmentary cross-sectional view of a filter medium according to a fourth embodiment of the present invention.

FIG. 6 illustrates a filter medium 1 according to a fourth embodiment of the present invention. The filter medium i includes a layer of filter paper 2 and three layers of nonwoven fabric 5. The layers 5a, 5b, 5c of the nonwoven fabric 6 have different fiber densities which are progressively higher downstream in the direction of a fluid to be filtered. More specifically, the upper layer 5a is of the lowest density, the intermediate layer 5b is of a density higher than the density of the upper layer 5a, and the lower layer 5c is of the highest density. The fiber densities of layers 5a, 5b and 5c are in the range of from 0.05 to 0.15 g/cm$^3$, from 0.1 to 0.2 g/cm$^3$ and, from 0.15 to 0.25 g/cm$^3$, respectively. The filter paper 2 is higher in density than the lower layer 5c, that is, the density of filter paper 2 is in the range of from 0.2 to 0.3 g/cm$^3$. The lower and upper layers 5c, 5a, or the intermediate layer 5b is thermally fusible to allow the filter paper layer 2 and the three nonwoven fabric layer 5a, 5b, 5c to be joined together by a heating roller (not shown).

The nonwoven fabric 5 which is composed of three layers 5a, 5b, 5c of different densities thus provides a density gradient& which is progressively higher downstream in the direction in which the fluid to be filtered flows. The lower-density nonwoven fabric layer is effective in trapping dust particles of greater diameter, whereas the higher-density nonwoven fabric layer is effective in trapping dust particles of smaller diameter The nonwoven fabric 5 can thus well sort out dust particles according to their size and form a good dust cake layer.

Figure 3:
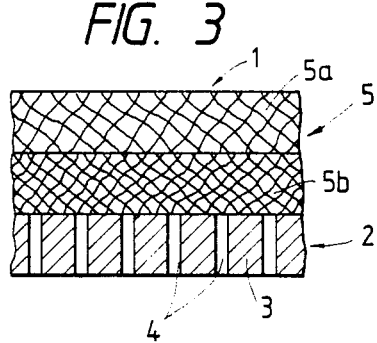
FIG. 3 is a fragmentary cross-sectional view of a filer medium according to a second embodiment of the present invention.
Figure 4:
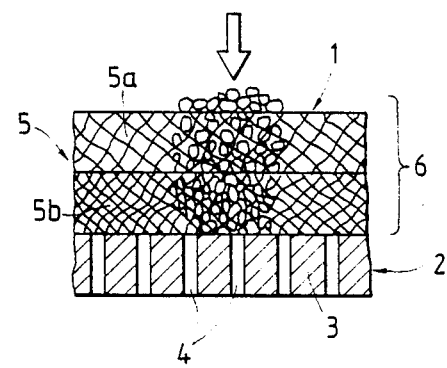
FIG. 4 is a fragmentary cross-sectional view showing the manner in which the filter medium of FIG. 3 operates.

While the nonwoven fabric 5 is in two layers and three layers in the embodiments of FIGS. 3 and 6, respectively, the nonwoven fabric 5 may be in four or more layers.

Various filter elements formed by corrugating the filter medium 1 shown in FIGS. 1 through 6 will be described below.

Figure 7:
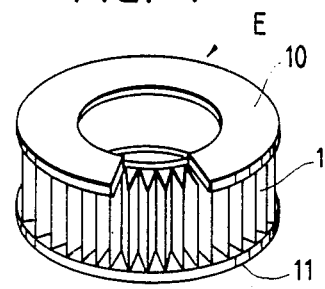
FIGS. 7 through 9 are perspective views of filter elements each comprising the filter medium according to the present invention.

FIG. 7 illustrates a filter element E for use in an oil filter or an air cleaner. The filter element E is constructed by creasing the sheet like filter medium 1 to form a number of ridges and grooves, and curving the creased filter medium 1 into a cylindrical shape. The upper and lower ends of the cylindrical filter element E are held against respective end plates 10, 11. The nonwoven fabric 6 is positioned on the outer peripheral surface of the cylindrical filter element E.

Figure 8:
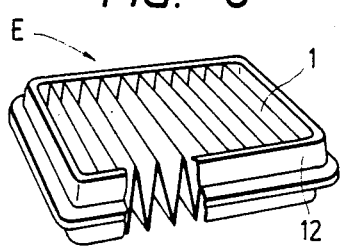

A filter element E shown in FIG. 8 is formed by corrugating the sheet like filter medium into creases and holding the filter medium i in a case 12. The nonwoven fabric 5 is positioned on the upper surface of the filter element E.

Figure 9:
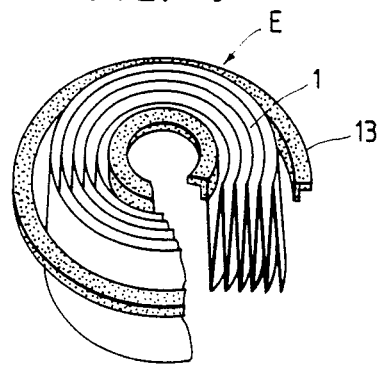

FIG. 9 shows a filter element E formed by folding the sheet-like filter medium 1 into creases, curving the filter medium into a circular shape, and placing the filter medium 1 in a case 13. The nonwoven fabric 5 is positioned on the upper surface of the filter element E.

Test Example

A test was conducted on Test Example filter medium according to the first embodiment of the present invention and a conventional filter medium which is composed of filter paper only. The results of the test will be described below.

The filter mediums used had a filtration area of 2000 $cm^2$, and dust used was of 8 kinds defined under JIS z8901. The test was performed according to JIS D1612. The amount of air used in the test was $2m^3/min$.

Figure 10:
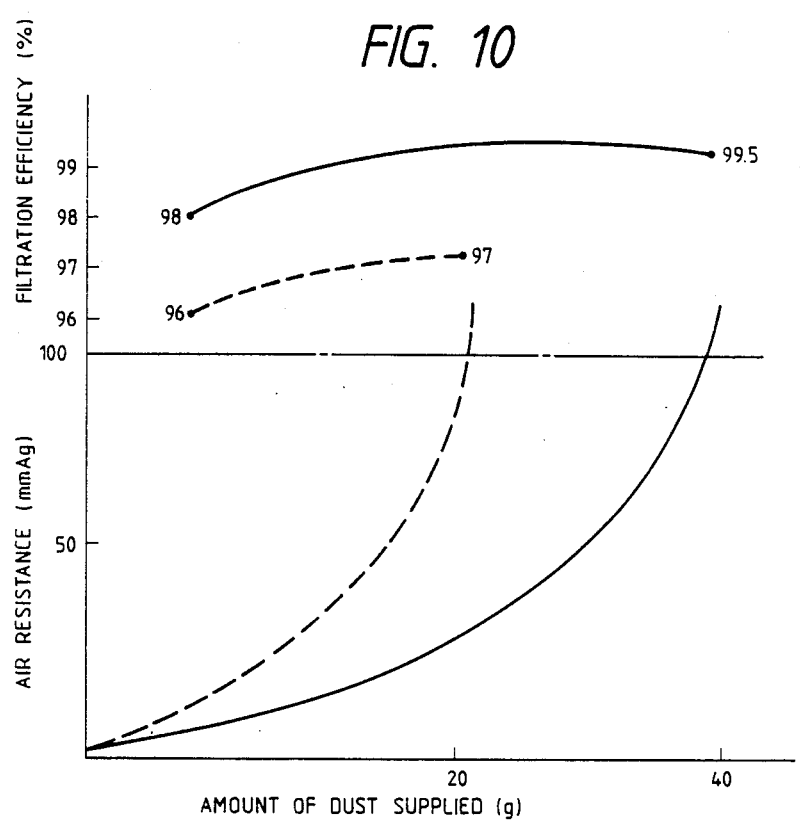
FIG. 10 is a graph showing the results of a comparison test conducted on a conventional filter medium and an inventive filter medium for filtration performance.

FIG. 10 shows the manner in which the filtration efficiency (%) varies with respect to the amount (g) of dust supplied. The horizontal axis of FIG. 10 represents the amount (g) of dust supplied, and the vertical axis the filtration efficiency (%). The broken-line curve indicates the filtration efficiency of the conventional filter medium, and the solid-line curve indicates the filtration efficiency of the inventive filter medium. It is apparent from FIG. 10 that the filtration efficiency of the filter medium according to the present invention is at least 2% higher than the filtration efficiency of the conventional filter medium.

FIG. 10 also shows the manner in which the air resistance (mmAq) varies with respect to the amount of dust supplied, the air resistance (mmAq) being represented by the vertical axis. The broken-line curve indicates the air resistance of the conventional filter medium, and the solid-line curve indicates the air resistance of the inventive filter medium. FIG. 10 clearly indicates that the air resistance of the inventive filter medium is much lower than the air resistance of the conventional filter medium.

With the present invention, as described above, the filter medium includes the lower-density nonwoven fabric on the upstream side and the higher density filter paper on the downstream side. The nonwoven fabric on the upstream entrance side of the filter medium promotes the formation of a dust cake layer which produces a primal filtration function for increased filtration efficiency and longer service life.

Relatively larger particles contained in a fluid to be filtered are effectively trapped by the entrance surface of the filter medium. Such surface trapping may prevent the particles from being embedded within the filter medium. Therefore, the filter medium of the present invention is less liable to be plugged or clogged than the conventional filter medium.

The filter medium of the present invention is free of various problems which would otherwise be caused by oil impregnated in the filter medium.

Since the filter paper and the thermally fusible nonwoven fabric are fused together, they can easily be joined to each other, and their bonding strength is high.

Although certain preferred embodiments have been shown and described, it should be understood that many changes and modifications may be made therein without departing from the scope of the appended claims.

What is claimed is:

1. A filter medium for an oil filter or an air filter for an internal combustion engine to remove dust particles from a fluid to be filtered; said filter medium comprising a nonwoven fabric of a lower fiber density which comprises at least two layers, and a filter paper of a higher fiber density, said nonwoven fabric and said filter paper being superposed in a laminated structure, one of said layers of the nonwoven fabric, which is closer to said filter paper, having a fiber density lower than that of the other of said layers of the nonwoven fabric which is located opposite to said filter paper with respect to the one of said layers, the one of said layers being a thermally fusible layer, said nonwoven fabric and said filter paper being joined together through the thermally fusible layer of the nonwoven fabric.

2. A filter medium according to claim 1, wherein the other of said layers has a fiber density of 0.15 to 0.25 $g/cm^3$, while the one of said layers has a fiber density of 0.1 to 0.2 $g/cm^3$ and said filter paper has a relatively high fiber density of 0.2 to 0.3 $g/cm^3$.

3. A filter which has a filter medium for an oil filter or an air filter for an internal combustion engine to remove dust particles from a fluid to be filtered; said filter medium comprising a nonwoven fabric of a lower fiber density which comprises at least two layers, and a filter paper of a higher fiber density, said nonwoven fabric and said filter paper being superposed in a laminated structure, one of said layers of the nonwoven fabric, which is closer to said filter paper, having a fiber density lower than that of the other of said layers of the nonwoven fabric which is located opposite to said filter paper with respect to the one of said layers, the one of said layers being a thermally fusible layer, said nonwoven fabric and said filter paper being joined together through the thermally fusible layer of the nonwoven fabric, said filter medium being arranged such that said nonwoven fabric and said filter paper are disposed upstream and downstream, respectively, in a direction in which said fluid to be filtered flows.

4. A filter according to claim 3, wherein the other of said layers has a fiber density of 0.15 to 0.25 g/cm$^3$, while the one of said layers has a fiber density of 0.1 to 0.2 g/cm$^3$ and said filter paper has a relatively high fiber density of 0.2 to 0.3 g/cm$^3$.

* * * * *